(12) United States Patent
Pillai et al.

(10) Patent No.: US 6,568,832 B1
(45) Date of Patent: May 27, 2003

(54) COLOR MIXING DEVICE

(75) Inventors: Manu Pillai, San Jose, CA (US); Len Gasiorek, San Jose, CA (US); Larry Childs, Petaluma, CA (US)

(73) Assignee: Maxtor Corporation, Longmont, CO (US)

(*) Notice: Subject to any disclaimer, the term of this patent is extended or adjusted under 35 U.S.C. 154(b) by 0 days.

(21) Appl. No.: 09/899,768

(22) Filed: Jul. 5, 2001

Related U.S. Application Data
(60) Provisional application No. 60/223,231, filed on Aug. 4, 2000.

(51) Int. Cl.$^7$ ................................................ F21V 9/00
(52) U.S. Cl. ...................... 362/231; 362/235; 362/26; 362/27; 362/31
(58) Field of Search ............................... 362/231, 235, 362/26, 27, 31

(56) References Cited

U.S. PATENT DOCUMENTS

| | | | |
|---|---|---|---|
| 4,111,548 A | | 9/1978 | Pechev et al. ................. 355/30 |
| 4,830,899 A | * | 5/1989 | Nakahashi et al. .......... 428/137 |
| 5,031,078 A | | 7/1991 | Bornhorst .................... 362/32 |
| 5,384,519 A | | 1/1995 | Gotoh ......................... 315/324 |
| 5,414,598 A | * | 5/1995 | Anderson .................... 362/26 |
| 5,921,652 A | * | 7/1999 | Parker et al. ................. 362/31 |
| 6,053,621 A | * | 4/2000 | Yoneda ....................... 362/245 |
| 6,139,166 A | | 10/2000 | Marshall et al. ............ 362/231 |
| 6,275,338 B1 | * | 8/2001 | Arai et al. ................... 359/599 |
| 6,280,054 B1 | * | 8/2001 | Cassarly et al. ............ 362/231 |

\* cited by examiner

*Primary Examiner*—Sandra O'Shea
*Assistant Examiner*—Jacob Y. Choi
(74) *Attorney, Agent, or Firm*—Marsh Fischmann & Breyfogle LLP

(57) ABSTRACT

A device for mixing light is disclosed. A mixer body has an aperture that preferably extends entirely therethrough. Light from multiple sources may be introduced on one side of the aperture and removed from the mixer on an opposite side thereof. Multiple reflections of the light between a surface of the body of the mixer that defines the aperture and surfaces of the body that define an exterior of the body promote the mixing of the light. One or more surfaces of the body may be roughened to further promote mixing of the light, for instance all exterior surface of the mixer body except the light entry which is preferably smooth. Another option that may be used alone or in combination with the noted roughening features is the inclusion of a plurality of reflective particles (e.g., metallic) embedded within the mixer body, bubbles embedded within the mixer body, or both. The device is particularly suited for applications where space constraints are an issue.

21 Claims, 2 Drawing Sheets

COLOR MIXING DEVICE

RELATED APPLICATIONS

This patent application claims priority from U.S. Provisional Patent Application Ser. No. 60/223,231, filed Aug. 4, 2000, and entitled "PRIMARY COLOR MIXING DEVICE," the entire disclosure of which is incorporated by reference in its entirety herein.

FIELD OF THE INVENTION

The present invention generally relates to the field of mixing colors of light and, more up particularly to a device/method that is able to sufficiently mix different colors of light over a relatively short distance between a light entry surface and a light exit surface.

BACKGROUND OF THE INVENTION

Various types of light indicators are used in many types of computer hardware, such as disk drives, servers, printers and the like. In many of these applications an amber light is produced by introducing both a red light source and a yellow light source into a relatively long and tortuous optical path. Although this may be acceptable in many situations, certain system configurations have insufficient space to accommodate this type of light mixing technique.

BRIEF SUMMARY OF THE INVENTION

The present invention generally relates to mixing light from different light sources into a single color of light. The present invention is embodied in a color mixing device that includes a mixer that in turn has an aperture. Light from at least two light sources (e.g., light of different wavelengths) each introduce light into the mixer along a path such that at least a portion of this light is at least generally directed toward a surface of the mixer that defines this aperture. Mixing of the light from the multiple light sources into a single color is accomplished by the multiple reflections that occur between that surface of the mixer that defines the aperture and exterior surfaces of the mixer.

Various refinements exist of the features noted in relation to the present invention. Further features may also be incorporated in the present invention as well. These refinements and additional features may exist individually or in any combination. The mixer may be formed from a plastic material, such as polycarbonate, glass, or any other appropriate light-transmitting material. The mixer may also be in the form of a solid body. Multiple particles may be embedded throughout this body. Enhancement of the mixing of the light from the multiple light sources is believed to be realized through the addition of these particles throughout the body of the mixer, particularly in the case where these particles are metal particles or formed from other reflective materials. Bubbles may also be encapsulated within this body to promote mixing as well. A combination of bubbles and particles of reflective material could also be utilized. Preferably, the noted aperture extends entirely through the body of the mixer.

The mixer may be characterized as having a light entry surface, namely that surface where light from the multiple sources is initially introduced into the mixer. The distance between the light entry surface and the aperture of the mixer may have an effect on the extent to which the light from the multiple light sources is mixed within the mixer. Preferably this distance is sufficiently small to encourage multiple reflections between the light entry surface and that surface of the mixer which defines the aperture. However, the distance between the light entry surface and the aperture must be sufficiently large so as to allow for sufficient transmission of light to that surface of the mixer which defines the aperture for reflection to even occur. In one embodiment, the distance between the light entry surface and that portion of the aperture which is closest to the light entry surface is within a range of about 5 mm to about 10 mm, and in another embodiment is no more about 1 mm.

The mixer may also be characterized as having a light entry surface where light is initially introduced into the mixer, and further as having a light exit surface where light exits the mixer. In one embodiment, the light entry surface is smooth and the light exit surface is in a roughened condition. Roughening of the light exit surface is believed to enhance the mixing of the light within the mixer. All exterior surfaces of the mixer in this particular embodiment, except the light entry surface, may be roughened to further promote sufficient mixing of the light. Preferably, the surface roughness of the "roughened" surfaces of the mixer in this case is at least about "Mold-Tech" standard MT-11040. In another embodiment, the light entry surface and the light exit surface both have a surface roughness of at least about "Mold-Tech" standard MT-11040.

The light entry and exit surfaces also may be characterized as being disposed on opposite sides of the aperture. In this case, the longitudinal extent of the first aperture may be disposed at least generally parallel to one or both of the light entry and exit surfaces. Furthermore and for the case where the light entry and exit surfaces are disposed on opposite sides of the noted aperture, the overall distance therebetween may be relatively small to allow the present invention to be used where space constraints exist. In one embodiment, the light entry and exit surfaces are separated by a distance of no more than about 12 mm, although other relative spacings may be utilized where space constraints are not an issue.

DETAILED DESCRIPTION OF THE INVENTION

Figure 1:
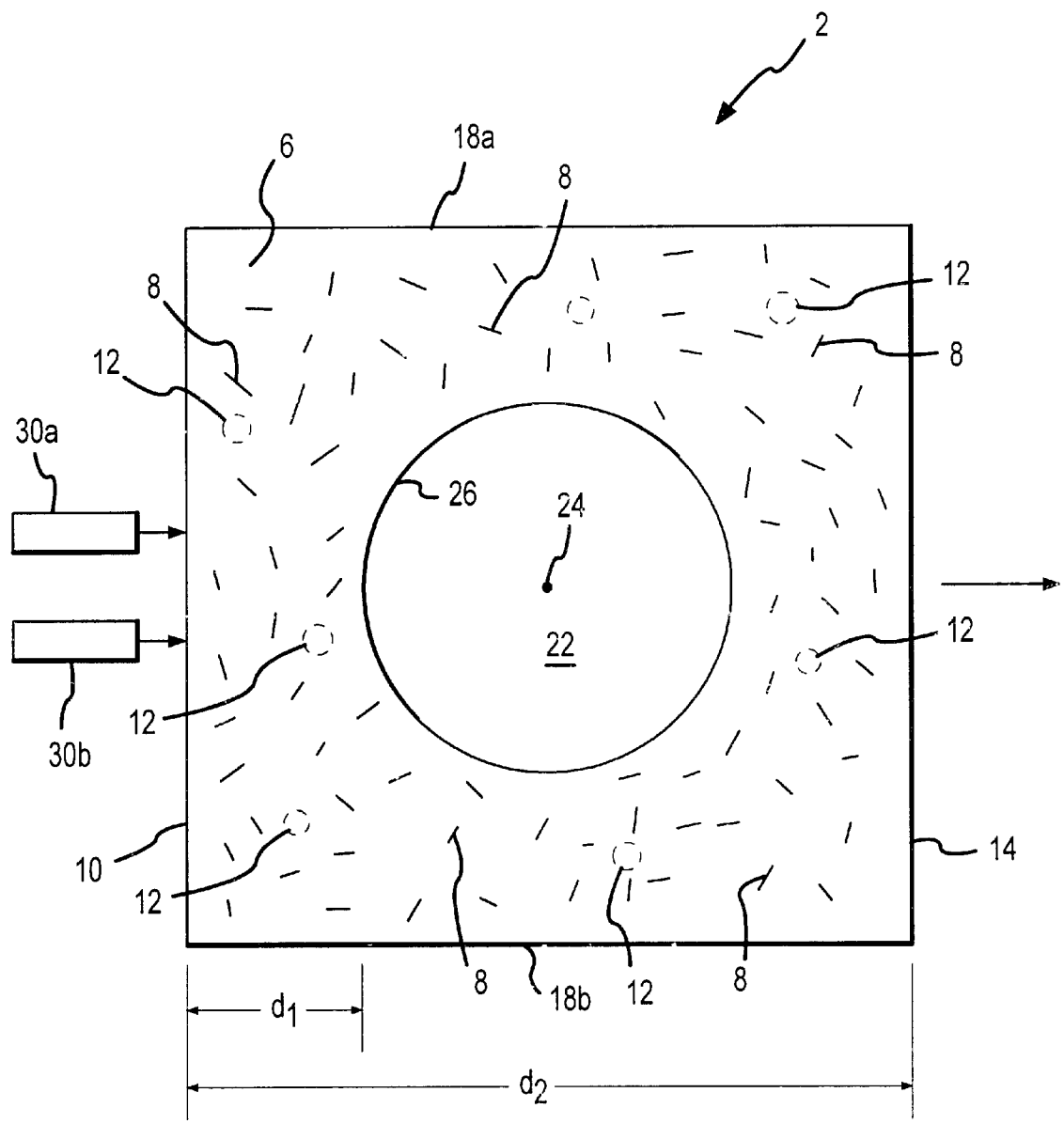
FIG. 1 is a side view of one embodiment of a color mixer with a mixing aperture.

The present invention will now be described in relation to the accompanying drawings which at least assist in illustrating its various pertinent features. One embodiment of a device for mixing colors is presented in FIGS. 1–2 in the form of a mixer 2. The mixer 2 generally includes a solid body 6 that has an aperture 22. This aperture 22 is disposed at least generally about a reference axis 24, and nonetheless extends at least generally along the reference axis 24. Preferably the longitudinal extent of the aperture 22 is at least generally parallel relation with the reference axis 24. As such, it would be appropriate to characterize the aperture 22 as having a length dimension that may be measured along the reference axis 24. In the illustrated embodiment, the aperture 22 extends entirely through the body 6 of the mixer 2. An interior surface 26 of the body 6 that defines the aperture 22 is cylindrical. Other shapes could be utilized for the aperture 22. For instance, the aperture 22 could be in the form of a slit, although the circular configuration is advantageous from a cost of manufacturing point of view.

The body 6 of the mixer 2 includes a light entry surface 10 and a light exit surface 14 that are disposed on opposite sides of the aperture 22. Portions of the body 6 are disposed between the interior surface 26 of the body 2 that defines the aperture 22 and each of the light entry surface 10 and the light exit surface 14. In the illustrated embodiment, both the light entry surface 10 and the light exit surface 14 are at least substantially planar, are at least generally parallel with each other, and are at least generally parallel with the reference axis 24 associated with the aperture 22. Having this configuration for the light entry surface 10 is advantageous for minimizing transmission losses through surface reflections. Other configurations could be utilized for the light exit surface 14. Cross-hatched cuts could also be formed on one or both of the light entry surface 10 and the light exit surface 14.

There are a number of other characteristics of the light entry surface 10 that contribute to the operation of the mixer 2. One is that the light entry surface 10 is preferably sized so as to be at least as large as the light emitting surface of the light sources 30a, 30b. Another is the distance $d_1$ between the light entry surface 10 and the adjacentmost portion of the aperture 22, which is measured at least generally perpendicular to the reference axis 24. This distance is important in relation to realizing adequate mixing of light within the mixer 2. Generally, the distance $d_1$ should be large enough to allow for transmission of light from the light entry surface 10 to the surface 26 that defines the aperture 22, and should be small enough to encourage multiple internal reflections within the body 6 of the mixer 2. In one embodiment, the distance di between the light entry surface 10 and the adjacentmost portion of the aperture 22 is within a range of about 5 mm to about 10 mm, and in another embodiment the distance $d_1$ is less than about 1 mm.

Light from multiple light sources 30a, 30b is introduced into the body 6 of the mixer 2 at the light entry surface 10 (e.g., at least two different colors of light). Although only two light sources 30a, 30b are illustrated in FIG. 1, any number of light sources 30a, 30b could be used for the mixing of light discharged therefrom within the body 6 of the mixer 2. Generally, light that is introduced into the body 6 of the mixer 2 is mixed by being reflected on multiple occasions between the surface 26 which defines the aperture 22, and the exterior surfaces of the body 6, including the light entry surface 10, the surfaces 18a and 18b, and the light exit surface 14. Again, light from the light sources 30a, 30b preferably impacts the light entry surface 10 in at least substantially perpendicular fashion to minimize transmission losses through surface reflections. Transmission losses may be further minimized by using a smoother texture for the light entry surface 10 than on the light exit surface 14.

Enhancement of the mixing of light from the multiplicity of light sources 30a, 30b maybe facilitated by potentially a number of factors. Initially, a plurality of particles 8 may be embedded within the body 6 of the mixer 2, a plurality of bubbles 12 (shown in dashed lines in FIG. 1) may be embedded within the body 6 of the mixer 2, or both. Preferably the noted particles 8 have reflective properties/capabilities. In one embodiment the particles 8 are of an appropriate metal such as aluminum. Another option for potentially enhancing the mixing of the light that is introduced into the body 6 of the mixer 2 is by having at least the light exit surface 14, and more preferably all exterior surfaces of the body 6 of the mixer 2, with the exception of possibly the light entry surface 10, be in a roughened condition. In one embodiment, the surface roughness of the light exit surface 14 is at least about "Mold-Tech" standard MT-11040, while the light entry surface 10 is smoother than "Mold-Tech" standard MT-11040. In another embodiment, both the light entry surface 10 and the light exit surface 14 have a surface roughness of at least about "Mold-Tech" standard MT-11040. Other surfaces of the body 6 may have a surface roughness of at least about "Mold-Tech" standard MT-11040 as well (e.g., surfaces 18a, 18b).

One benefit of the configuration of the mixer 2 is a reduced spacing between the light entry surface 10 and the light exit surface 14, while still realizing sufficient mixing of light from multiple light sources 30a, 30b. This allows the mixer 2 to be used in system configurations where space limitations are an issue. In one embodiment, the light entry surface 10 and the light exit surface 14 are separated by a distance $d_2$ that is no more than about 12 mm, and in another embodiment by a distance $d_2$ that is no more than about 10 mm.

Figure 2:
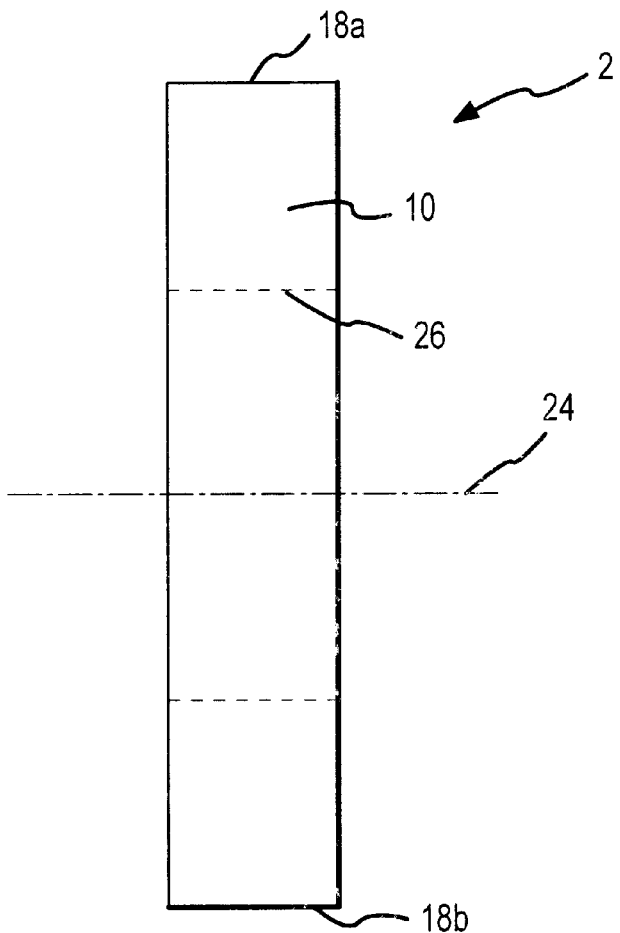
FIG. 2 is an end view of the color mixer of FIG. 1.
Figure 3:
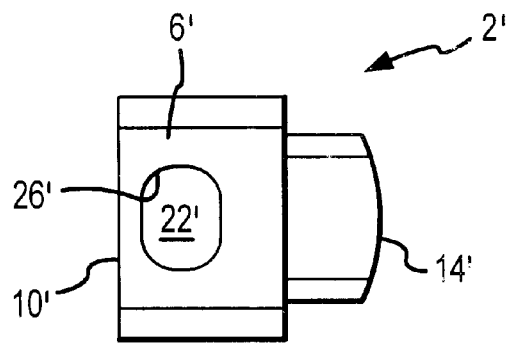
FIG. 3 is an alternate embodiment of a color mixer with a mixing aperture.

Another embodiment of a device for mixing colors is presented in FIG. 3 in the form of a mixer 2'. Components of the mixer 2' which correspond with those discussed in relation to the mixer 2 of FIGS. 1–2 are identified by the same reference numerals. However, a "single prime" designation is used in FIG. 3. The mixer 2' operates on the same general principles of the mixer 2 FIGS. 1–2, and may include each of the above-noted features. Generally, the mixer 2' uses a different configuration for the surface 26' that defines the aperture 22', and a different configuration for the body 6'. The aperture 22' is oblong, although its longitudinal extent is still at least generally parallel with the light entry surface 10' and the light exit surface 14'. The body 6' is "necked down" over that portion thereof which includes the light exit surface 14'. The light exit surface 14' is also curved in at least one dimension (e.g., at least generally convex).

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A color mixing device, comprising:
   a mixer that comprises a solid body that in turn comprises a first aperture, wherein an interior surface of said body defines said first aperture, and wherein said body further comprises an exterior surface; and
   first and second light sources that are at least operatively interconnected with said mixer and are oriented relative to said mixer to introduce light into said solid body through said exterior surface, wherein light from said first and second light sources is mixed by undergoing multiple reflections between said exterior surface and said interior surface as it progresses through said solid body and exits said solid body.

2. A device, as claimed in claim 1, wherein: said solid body is formed from a light transmitting material.

3. A device, as claimed in claim 1, wherein: said solid body comprises a light entry surface on said exterior surface, wherein light is introduced into said solid body on said light entry surface.

4. A device, as claimed in claim 3, wherein:
a distance from said light entry surface to a portion of said first aperture which is closest to said light entry surface is no more than about 1 mm.

5. A device, as claimed in claim 3, wherein:
a thickness from said light entry surface to a portion of said first aperture which is closest to said light entry surface is great enough to allow for transmission of light within said solid body and is small enough to encourage reflection of light within said solid body.

6. A device, as claimed in claim 3, wherein:
said light entry surface is planar, and wherein a reference ray that extends perpendicularly from said light entry surface to said reference axis is perpendicular to said reference axis.

7. A device, as claimed in claim 3, wherein:
said solid body further comprises a light exit surface on said exterior surface, wherein said light entry surface has a surface roughness that is less than a surface roughness of said light exit surface.

8. A device, as claimed in claim 3, wherein:
said solid body further comprises a light exit surface on said exterior surface, wherein both said light exit surface and said light entry surface are roughened.

9. A device, as claimed in claim 3, wherein:
said solid body further comprises a light exit surface on said exterior surface, wherein at least one of said light entry and exit surfaces has a surface roughness of at least about "Mold-tech" standard MT-11040.

10. A device, as claimed in claim 1, wherein:
said solid body comprises a plurality of embedded particles.

11. A device, as claimed in claim 10, wherein: said particles are metal.

12. A device, as claimed in claim 10, wherein: said particles are reflective.

13. A device, as claimed in claim 1, wherein:
said solid body comprises a light exit surface on said exterior surface, wherein said light exit surface comprises a surface roughness of at least about "Mold-tech" standard MT-11040.

14. A device, as claimed in claim 1, wherein:
said solid body comprises a light exit surface on said exterior surface, wherein said light exit surface is roughened.

15. A device, as claimed in claim 1, wherein:
said solid body comprises a light entry surface on said exterior surface, wherein said light entry surface is smooth, and wherein a remainder of said exterior surface is roughened.

16. A device, as claimed in claim 1, wherein:
said solid body comprises a light entry surface and a light exit surface on said exterior surface, wherein a longitudinal extent of said first aperture is oriented at least generally parallel with each of said light entry and exit surfaces.

17. A device, as claimed in claim 1, wherein:
said solid body comprises a light entry surface and a light exit surface on said exterior surface, wherein said first aperture is disposed between said light entry and exit surfaces such that said first aperture is spaced from each of said light entry and exit surfaces.

18. A device, as claimed in claim 1, wherein: said first aperture extends entirely through said solid body.

19. A device, as claimed in claim 1, wherein:
a configuration of said first aperture is selected from the group consisting of cylindrical, oblong, and a slit.

20. A device, as claimed in claim 1, wherein: said solid body comprises a plurality of embedded bubbles.

21. A color mixing device, comprising:
a solid body comprising a light entry surface disposed on an exterior of said solid body and a light exit surface also disposed on said exterior of said solid body, wherein said light entry surface and said light exit surface are disposed on opposite ends of said solid body;

a first aperture defined by an interior surface within said solid body and disposed between said light entry surface and said light exit surface; and first and second light sources that are at least operatively interconnected with said light entry surface, wherein light from said first and second light sources travels through said solid body and is reflected by said interior surface to promote mixing of light from said first and second sources prior to exiting said solid body through said light exit surface.

* * * * *